US007014355B2

(12) United States Patent
Potter, Sr. et al.

(10) Patent No.: US 7,014,355 B2
(45) Date of Patent: Mar. 21, 2006

(54) ELECTRONIC PARKING METER SYSTEM

(75) Inventors: Thomas R. Potter, Sr., Reno, NV (US); Ralph C. Ferguson, N. Hollywood, CA (US)

(73) Assignee: Innovapark Company LLC, New York, NY (US)

( * ) Notice: Subject to any disclaimer, the term of this patent is extended or adjusted under 35 U.S.C. 154(b) by 214 days.

(21) Appl. No.: 09/866,919

(22) Filed: May 30, 2001

(65) Prior Publication Data

US 2002/0109609 A1 Aug. 15, 2002

Related U.S. Application Data

(63) Continuation-in-part of application No. 08/720,721, filed on Oct. 2, 1996, now abandoned, and a continuation-in-part of application No. 09/525,148, filed on Mar. 14, 2000, now abandoned.

(51) Int. Cl.
*G04F 1/00* (2006.01)
*G06F 19/00* (2006.01)
*B60Q 1/48* (2006.01)
*G08G 1/01* (2006.01)

(52) U.S. Cl. .................... 368/90; 194/216; 340/932.2; 340/941

(58) Field of Classification Search .................. 368/90; 340/693.9, 693.12, 932.2, 933, 941; 194/217, 194/317, 334; 190/216
See application file for complete search history.

(56) References Cited

U.S. PATENT DOCUMENTS 3,873,964 A 3/1975 Potter
3,875,555 A 4/1975 Potter
3,900,092 A * 8/1975 Page et al. .................. 194/241
3,943,339 A 3/1976 Koerner et al.
3,989,932 A 11/1976 Koerner
RE29,511 E 1/1978 Rubenstein
4,131,848 A * 12/1978 Battle .......................... 324/236
4,183,205 A * 1/1980 Kaiser .......................... 368/90
4,358,749 A * 11/1982 Clark .......................... 340/941
4,472,706 A 9/1984 Hodge et al.
4,491,841 A 1/1985 Clark
4,568,937 A * 2/1986 Clark .......................... 340/939
4,680,717 A 7/1987 Martin
4,812,805 A * 3/1989 Lachat et al. ............... 370/439
4,825,927 A * 5/1989 Woodrow ...................... 160/1
4,871,993 A * 10/1989 Hayashi et al. ............. 340/439
4,895,238 A * 1/1990 Speas .......................... 194/319
4,939,512 A * 7/1990 Dennison et al. ........... 340/933
5,029,094 A * 7/1991 Wong .......................... 705/418
5,153,525 A 10/1992 Hoekman et al.
5,153,586 A * 10/1992 Fuller ...................... 340/932.2
5,407,049 A * 4/1995 Jacobs ........................ 194/200

(Continued)

*Primary Examiner*—Vit W. Miska
(74) *Attorney, Agent, or Firm*—R. J. Lasker, Esq.

(57) ABSTRACT

The field of the present invention is parking meters and more particularly to the use of electronically operated parking meters coupled with a sensor for positively sensing unobtrusively the presence or absence of a vehicle in a specified parking space controlled by the sensor and electronically operated parking meter. An induction coil mounted below the surface of the parking area is used to provide positive signals to the electronically operated parking meter and a cpu upon both the entrance of a vehicle into the parking space and the movement of the vehicle from the parking space. Moreover, the detecting system is battery operated and the battery life is extended by duty cycle operation of the detector system, whereby only a small portion of a detecting cycle is actually employed for detecting the status of the parking space.

30 Claims, 9 Drawing Sheets

U.S. PATENT DOCUMENTS 5,442,348 A * 8/1995 Mushell .................. 340/932.2
5,570,771 A 11/1996 Jacobs
5,659,306 A * 8/1997 Bahar ...................... 340/932.2
5,903,520 A 5/1999 Dee et al.
5,936,551 A 8/1999 Allen et al.
6,081,205 A * 6/2000 Williams ................. 340/932.2

* cited by examiner

ELECTRONIC PARKING METER SYSTEM

CROSS-RELATED PATENT APPLICATIONS

This application is a continuation-in-part of application Ser. No. 08/720,721, filed Oct. 2, 1996 now abandoned and patent application Ser. No. 09/525,148, filed Mar. 14, 2000 now abandoned.

BACKGROUND OF THE INVENTION

1. Field of the Invention

The field of the present invention is parking meters and more particularly to the use of electronically operated parking meters coupled with a sensor for positively sensing unobtrusively the presence or absence of a vehicle in a specified parking space controlled by the sensor and electronically operated parking meter. In the present invention an induction coil mounted below the surface of the parking area is used to provide positive signals to the electronically operated parking meter and a cpu upon both the entrance of a vehicle into the parking space and the movement of the vehicle from the parking space.

Moreover, the detecting system is battery operated and the battery life is extended by duty cycle operation of the detector system, whereby only a small portion of a detecting cycle is actually employed for detecting the status of the parking space.

2. Related Art

Parking meters have traditionally been used to raise revenue. Such devices have included a timer and a winding mechanism requiring coins. More recently, electronic meters have been developed which include an electronic timer with an LCD time indicator.

With the advent of the electronic meter, attempts have been made to make the meter interactive with vehicle traffic in the associated parking space. One way to obtain information about vehicle traffic at parking spaces is to couple the parking meter to a vehicle sensor. The vehicle sensor can detect when a vehicle enters a parking space as well as when the vehicle leaves. One such system uses an infra-red light beam to detect vehicle presence at a parking space.

Individual parking meter systems have each utilized different vehicle sensors, such as an infra-red light beam, ultrasonic systems and inductance type sensors to detect the presence or absence of a vehicle in an associated parking space.

One problem with light beam detection is that the beam does not distinguish between a vehicle and any other solid object. Thus, the system could be disabled by simply covering the window from which the light beam is emitted with a piece of tape or cardboard. In addition, false activity could occur with the opening of a door or other movement in front of the meter sensor. Even temperature or humidity changes could cause problems. Consequently, interest remains in developing an electronically controlled parking meter system that overcomes the aforementioned problems and is capable of accurately detecting vehicle traffic at a parking space.

There are a number of known parking meter vehicle detector systems, namely:

(1) U.S. Pat. No. 3,873,964; Vehicle Detection; Potter

The loop oscillator of the vehicle detector system continually oscillates at the resonant frequency during normal operation of the system and digital circuitry in the system measures the frequency of the loop oscillator by a cycle-counting technique. An automatic timing circuit generates a reference frame time for the frequency counting measurement. The reference frame time is a function of the desired operational sensitivity of the system and of the resonant frequency of the loop and lead-in loop oscillator frequency-determining circuit. A vehicle is detected whenever an increase of loop oscillator frequency counts occurs from one reference frame time to the next, and when that increase exceeds a predetermined threshold.

(2) U.S. Pat. No. 3,875,555; Vehicle Detection System; Potter; Indicator Controls, Corp.

The magnetic inductance vehicle detection system includes an embedded wire loop to sense the presence of a vehicle in a roadway. A first oscillator connected to the loop changes frequency as the loop inductance changes due to the presence of a vehicle. A second oscillator with a frequency independent of the loop inductance is used as a reference. Logic circuitry emits a signal whenever the oscillator loop frequency exceeds a predetermined frequency beyond a predetermined frequency differential.

(3) U.S. Pat. No. Re29511; Parking Meter; Rubenstein

The parking meter electrically indicates "remaining time" and electrically operates only in the presence of a vehicle and when there is "paid-for" time on the meter. Unused time by one departing motorist is cancelled.

(4) U.S. Pat. No. 3,943,339; Inductive Loop Dectector System; Koerner et al.; Canoga Controls Corporation An oscillator circuit is operatively connected to each one of multiple inductance loops each located in a given space in a roadway and the loop frequency is monitored by a counter measuring the time duration or period of loop oscillator cycles. The monitored oscillator cycle is then compared with a reference duration to determine whether the loop oscillator frequency has increased or decreased.

(5) U.S. Pat. No. 3,989,932; Iductive Loop Vehicle Detector; Koerner; Canoga Controls Corporation Oscillator circuitry is connected to an inductance loop for detecting the presence of vehicles and the loop frequency is monitored by a loop counter for counting the loop oscillator cycles. A duration counter measures the time duration of a fixed number of loop oscillator cycles and the count is compared with an adaptable reference duration to determine an increase or decrease in the loop inductance, thereby determining the presence or absence of a vehicle in the inductance loop.

(6) U.S. Pat. No. 4,358,749; Object Detection; Clark; Redland Automation Limited An inductive sensing loop is connected with an oscillator provided with a voltage controlled capacitor in a phase locked loop providing a reference frequency (VCO). The voltage of the capacitor varies in the presence of a vehicle and this varying voltage is applied to an auxiliary VCO whose frequency is accordingly varied and analyzed for detection purposes. A microcomputer includes a clock source that is a reference frequency source.

(7) U.S. Pat. No. 4,472,706; Vehicle Presence Loop Detector; Hodge et al.; Not Assigned A tuned circuit having a magnetic field-producing induction loop produces changing signals in the presence of a vehicle. A first signal amplifier amplifies the signal from the loop and a second amplifier responds to the positive or negative polarity input from the first amplifier to provide an output in response to a rapidly changing input which activates a logic gate for sensing the polarity of the second amplifier output and producing a gated output signal indicative of the presence or absence of a vehicle within the loop.

(8) U.S. Pat. No. 4,491,841; Self-Adjusting Inductive Object-Presence Detector; Clark; Sarasota Automation Limited An oscillator includes an inductive sensing loop and a first counter samples the oscillator frequency or period and the resulting count is applied as a preset reference to a second counter which is counted down in one sample period while a new count is counted by the first counter. The residue in the second counter at the end of a sample period is indicative of the presence or absence of a vehicle. Provision is made for detection of the departure of a vehicle by use of additional counters.

(9) U.S. Pat. No. 4,680,717; Microprocessor Controlled Loop Detector System; Martin; Indicator Controls Corporation A microprocessor-controlled loop detection system is connected to a number of inductive loops which are individually located to detect the presence of motor vehicles above the loops to control motor vehicles at a traffic intersection. A common oscillator is connected to each loop on a time shared basis and the microprocessor counts the number of cycles of the oscillator output signal to determine the oscillator frequency.

(10) U.S. Pat. No. 5,153,525; Vehicle Detector with Series Resonant Oscillator Drive; Hoeckman et al.

The series resonant oscillator circuit drives an inductive load including an inductive sensor and a detection system using the series resonant oscillator circuit and inductive sensor. An inductive load is connected in the series path with a capacitative impedance. An oscillator signal provides power to the series path and is controlled as a function of current sensed in the series path. The frequency of the oscillator signal changes as a function of changes in the inductance of the inductive sensor.

(11) U.S. Pat. No. 5,570,771; Electronic Parking Meter and System; Jacobs

The parking meter system uses a low-current drain electronic parking meter and a mobile transceiver. A sonar transducer detects the presence of a vehicle in an adjacent parking space and an infra red transceiver communicates with the mobile transceiver. A microprocessor responds to electrical signals from the various detectors to provide data displayable on a display and transmittable by the IR transceiver to the mobile transceiver. The meter is entirely battery operated and can operate for an extended period of time, for example, six months to one year, without battery replacement.

(12) U.S. Pat. No. 5,903,520; Electronic Module for Conventional Parking Meter; Dee et al.

The electronic module comprises a shell attachable to a conventional parking meter and a meter condition sensor for detecting, from a distant point, time and violative conditions of the parking meter with the indicator in an indicating mode, and an ultrasonic vehicle sensor affixed to the shell for detecting a parked vehicle. The electronic module further includes electronic circuitry with a power source for operating the module; means for receiving a first signal from the meter condition sensor and a second signal from the vehicle sensor; means for processing the first and second signals and means for transmitting a coded message to a remote receiver.

(13) U.S. Pat. No. 5,936,551; Vehicle Detector with Improved Reference Tracking; Allen & Potter A vehicle detector having improved reference tracking routines in both the NO CALL and CALL directions and wherein CALL direction tracking includes rate sensitive tracking wherein the reference is only changed in response to small fluctuations in loop frequency due to drift, and one or more fixed decrementing tracking intervals during which the reference is decremented at a fixed rate for a maximum predetermined period of time. CALL direction tracking also included infinite tracking during which the reference is decremented to an end value representative of loop inductance prior to the end value representative of loop inductance prior to the generation of a CALL signal. No CALL tracking enables reference updating only after the loop frequency has stabilized for a minimum period of time, a minimum number of loop frequency samples or both.

SUMMARY OF THE INVENTION

The present invention is directed to an electronically controlled parking meter system which employs an electronically operable parking meter in combination with an inductive loop coil used for vehicle detection. Over the past forty years inductive loops have been used for many types of systems requiring vehicle detection. Such systems include traffic control signal systems, automatic gates, drive thru restaurants, etc. Inductive loops, when properly installed, have proven to be very reliable for the purpose of vehicle detection.

In a first, separate aspect of the invention, an electronically operable parking meter may be coupled to an induction coil vehicle detection sensor located or embedded in the surface of the parking space for selectively controlling the electronically operable parking meter responsive to the inductive loop sensor. A vehicle entering or leaving the parking space causes a change in the apparent inductance of the inductive loop and the resulting signal output from the sensor may be used to control the electronically controlled parking meter and associated control circuitry. The electronically operable parking meter system may be used to initialize or reset the parking meter when the inductive loop sensor indicates the entry or departure of a vehicle from the associated parking space. The electronically operable parking meter system may also be used to accumulate data associated with the activity of the particular parking space; such as number of vehicles using the space, duration of elapsed time for eah or all vehicles using the space, etc.

In a second, separate aspect of the present invention, multiple electronically operable parking meters may be coupled to a single power supply. Each electronically operable parking meter may be coupled to a separate inductive loop vehicle sensor for selectively controlling the parking meter responsive to its sensor, as in the electronically operable parking meter of the first, separate aspect.

In a third, separate aspect of the present invention, the electronically operable parking meter of the second, separate aspect may include a remote data processing unit (DPU). The remote DPU may be coupled to each electronically operable parking meter. The remote data processing unit may be utilized for gathering data in order to obtain statistics on vehicle traffic, traffic patterns, and other information, which could be utilized for establishing more efficient use of parking spaces. This system would be deployed for monitoring and/or controlling a large number of parking spaces; for example, a parking garage, or the length of an entire street, etc.

A fourth aspect of the present invention is that the parking meters are electrically operated as opposed to mechanical operation of known parking meters.

A fifth aspect of the present invention relates to the use of solar energy for providing the electric power to operate the electronically operable parking meter system, and in particular the electronically operable parking meter(s) and the associated electronics. This involves at least the consideration of using solar panels in ambient sunlight as well as direct sunlight since the electronically operable parking meter system may be utilized in locations where direct sunlight is not available or only intermittently available.

A sixth aspect of the present invention relates to the modification of existing parking meters, and particularly mechanically operable parking meters, to enable them to function in the electronically operable parking meter system of the present invention.

A seventh aspect of the present invention concerns the economical optimization of electronically operable parking meter systems by controlling the electronically operable parking meter so that the meter is "zeroed" when the inductive loop sensor associated with the meter detects that a vehicle has vacated the parking space controlled by the inductive loop.

Accordingly, it is an object of the present invention to provide an electronically operable parking meter system which is capable of detecting the vehicle traffic at particular parking spaces.

More particularly, it is an object of the present invention to electrical circuits and connections to existing mechanically operated meters to enable them to operate electronically.

Still another advantage of the present invention is that the cost of a parking meter system may be reduced by modifying existing mechanical type parking meters to operate electrically.

Yet another object of the present invention is to increase the the economical operation of electronically operable parking meter systems.

Yet another advantage of the electronically operable parking meter system of the present invention is that the parking time purchased for a specific vehicle can only be used by that vehicle. When any vehicle vacates the parking space the remaining time is lost; and the next arriving vehicle must purchase new time for the use of the parking space.

Yet another advantage of the electronically operable parking meter system of the present invention is that a limited amount of parking time may be provided, possibly at no cost, for arriving vehicles. Further, the vehicle would not be able to purchase additional time for the space. This operation of the electronically operable parking meter system would control the allowed time of use for each vehicle. Limited parking time is common practice near Post Offices, banks, etc.

The vehicle detection system/parking meter system produces a variety of value-added parking meter capabilities. The vehicle detector system utilizes ultra low power "wire loop detection" technology and a programmable microprocessor to interface with a provide positive and accurate sensing of the presence or absence of a vehicle in a particular parking space within a given vehicle parking area.

It is a feature that the sensors employed by the electronically operable parking meter system of the present invention are inductive loop sensors embedded in the surface of a parking space.

It is an advantage of the present invention that the inductive loop sensor is unobtrusive and not hindered by the presence of surface objects in the vicinity of the parking space.

It is yet another object of the present invention to connect a plurality of electronically operated parking meters to a single electrical power source, which may include electric batteries, mains power and/or solar powered electrical energy.

It is yet another feature that rechargeable batteries in conjunction with solar power energy may be used to provide emergency electrical power for the electronically controlled parking meter system of the present invention in the event of failure of a main power supply.

It is yet another advantage of the electronically controlled parking meter system of the present invention that the electrical power for operating the electronically operable parking meters, inductive loop sensors, and the DPU is automatically rechargeable.

Still another object of the present invention is to enable existing parking meters to be modified to operate electronically.

Still another feature of the present invention is to provide digital or electronic parking meter. The vehicle detector reliably detects the arrival and departure of automobiles and motorcycles from a given parking space and sends the appropriate arrival/departure signal to the digital meter. This signal then enables the parking meter to accomplish any number or pre-programmed functions.

The value added functionality includes:

(1) Reset the digital parking meter to zero when the parking space is vacated, thus significantly increasing meter revenue in high demand situations. Independent research reveals that average revenue increase approximately 27% in high demand parking locations when using this technique.

(2) Prevent "meter feeding" by not posting additional time for over-limit payments until after the parking space has been vacated, thus forcing parking space turnover and, in effect, increasing overall parking capacity.

(3) Automatically allocate free time as the parking space is occupied. This will enable very short term parking spaces in front of commercial establishments like dry cleaners and convenience stores to be more effectively managed.

(4) Track all parking space related events, making it possible to analyze this data to determine how to most cost effectively deploy parking resources.

For many years the ubiquitous mechanically operated parking meter has toiled in anonymity, quietly taking quarters and dispensing 10–30 minutes of parking privileges. This "ironclad" version of the mechanical kitchen timer has been the standard for parking control in cities across the nation for decades.

However, several years ago, the old mechanical meter began to be replaced by a newer, more modern alternative, namely the new electronic or digital meter that utilizes an LCD read out and far fewer moving parts. It was the first real improvement in parking meters in many years. The meter offered the municipalities utilizing it few additional benefits other than fewer parts to break or replace.

However, with the present invention there is a parking system which redefines the way parking authorities monitor, track and enforce metered parking spaces in their cities or municipalities. This system enables a digital parking meter to become a data collection device that can both control and monitor a range of activities in a given parking space.

While raising parking rates is an unpopular step as perceived by municipal managers, the technology of the present invention can increase parking revenues without raising parking rates. Additionally, with the ability to collect and analyze parking space occupancy and turnover data, the present invention provides a parking authority with the information to enable it to save money, by making more efficient use of all of the parking resources.

The present invention utilizes a programmable microprocessor that links the digital parking meter directly to the parking space by utilizing loop detection technology. Traffic engineers have used traditional high voltage loop detection technology to manage traffic signals for years. Wires embedded in the pavement at intersections sense when a vehicle is stopped at a signal and changes the light. The vehicle detection system of the present invention works substantially the same way only with an ultra low power detection system. A wire is run from the parking meter, down the inside of the meter pole and is embedded in the pavement in the form of a coil. The coil is installed in the parking space associated with the parking meter. When a vehicle enters the parking space, the meter is signaled by the vehicle detection system, the event is time-stamped, and whatever meter functions have been preprogrammed are initiated. The process is repeated when the vehicle leaves the parking space as the vehicle detector system notifies the digital meter of that event.

One principal feature of the invention is the "time sweep" function. When a customer leaves the parking space and there is still time remaining on the parking meter, the vehicle detection system resets the timer to zero. In high demand situations, this feature will enable the parking authority to generate significantly greater revenue. Independent research confirms that the benefit of this feature is an improvement in revenue of 10 to 40% and an average of 27% in high demand spaces. With the present invention, meter revenue that was previously limited to a fixed number of coins per day can now become variable based upon usage. Since many municipalities rely heavily on parking meter revenue to fund their operating budgets, it has been discovered that the potential of being able to generate a significant increase in revenues, without raising the price of parking, is a key selling point for the present invention.

On a "stand-alone" basis, the electronic single-space parking meter has a flexibility that has previously not been available to the parking authority. The electronic parking meter now knows where it is, who it is, the time of day, the day of the week and the day of the year.

All of these features combine to allow a wider range of benefits to the parking system operator. By virtue of flexible internal programming the electronic parking meter can:

(1) Change rate structures several times a day;

(2) Put itself to "sleep" during specified periods;

(3) Recognize that it is out of order and display that information;

(4) More accurately discriminate valid from invalid payment tokens (coins, etc.);

(5) Accept electronic payment in lieu of cash.

The present invention expands these features by providing information about the real time occupancy of the parking space that is controlled by its associated electronic meter. When the vehicle detector system of the present invention is connected to the electronic meter described above, the electronic meter may be programmed to add "free" time to the parking clock when a vehicle arrives in a parking space, and remove remaining time when the vehicle leaves. The electronic meter can also be programmed to disregard any coins deposited after a full time limits worth of time has been purchased by the current occupant (also known as Meter-feeding), and resetting itself to function normally after the current occupant departs the space.

The newest electronic meters are capable of storing a vast number of incident records in NOVRAM (non-volatile random access memory) to be later retrieved and analyzed in addition to the features listed for the older model, above. These incident records reveal the exact date and time of any pre-programmed transaction. For example, a transaction record can be stored every time a payment token is inserted into the meter. If the token is deemed valid, the value is displayed on the parking clock and that transaction is stored. If the coin is judged invalid, the transaction record shows that fact and no time is added to the parking clock. A record can be stored should the electronic meter become dysfunctional, showing that exact time and date. When the electronic meter is restored to operability, a record is stored noting that event.

With the addition of the vehicle detector system of the present invention to the new electronic parking meter as briefly described above, a transaction record can be stored showing the exact date and time of the arrival of a vehicle and the exact date and time of departure. This data, when combined with the other records being stored, can provide a wide variety of real-time management information to the parking manager. Among other facts, when the vehicle detection system of the present invention is employed, the analysis can show:

(1) Daily occupancy;

(2) Daily Space Turnover;

(3) Over-limit stays and amount of time in violation:

(4) Length of stay for each occupant;

(5) Duration of vacant time; and (6) Time-span of highest usage.

When the above data are combined with data collected by an electronic citation issuance system, the parking manager can learn which enforcement tactics work best in subsections of the on-street parking system. The deployment of repair and enforcement personnel can be managed based on legitimate data retrieved from discrete areas within the system, thereby saving many labor hours of unproductive time.

Thus a first object of the present invention is directed to an electronically controlled parking meter system which employs an electronically operable parking meter in combination with a low power, battery-operated vehicle detection system employing an induction coil.

Therefore in a first feature of the invention, an electronically operable parking meter is coupled to a detector for detecting the status of an induction coil vehicle detection sensor located or embedded in the surface of the associated parking space for selectively controlling the electronically operable parking meter. A vehicle entering or leaving the parking space causes a change in the apparent inductance in the induction coil and the resulting signal output is used to control the electronically controlled parking meter and associated control circuitry. The electronically operable detector parking meter system of the invention is used to re-initialize the electronic parking meter when the induction coil sensor indicates the entry or departure of a vehicle from the associated parking space.

Each electronic parking meter includes a preformed induction coil comprising several turns of wire and a specified perimeter. The wire leads from the coil to the detector electronics are twisted to form a single pair conductor. This pre-formed loop construction is advantageous as it simplifies installation and also insures that the detector loop is correct when installed. In a preferred embodiment of the invention, the coils each comprise four turns of wire and have an approximate perimeter of ten feet.

A second object of the present invention is to provide a parking meter detection system wherein each of the detectors and electronically operable parking meters are operated by separate, independently operable battery power supplies.

The detector of the invention utilizes a duty cycle ON/OFF technique to preserve battery power and wherein the detector operates at a preferred frequency of 80 KHz and is ON for approximately 12.5 ms and is OFF for 2.5 sec. minus 12.5 ms. Thus, the detector is ON for approximately only 0.5% of the duty cycle of the detector. This conserves the battery power of the detector so that it may actually last longer than the other battery in the electronic parking meter.

A third, object of the present invention is to include a microprocessor in the detector for providing serial control and information data to the electronically operable parking meter.

A fourth object of the present invention is that both the detector and the associated parking meter are electronically operated.

A fifth object of the present invention concerns the economical optimization of parking meter systems by controlling the electronically operable parking meters so that the meter is "zeroed" when the induction coil sensor associated with the meter detects that a vehicle has vacated the parking space controlled by the induction coil.

Other and further advantages will appear hereinafter.

Figure 1:
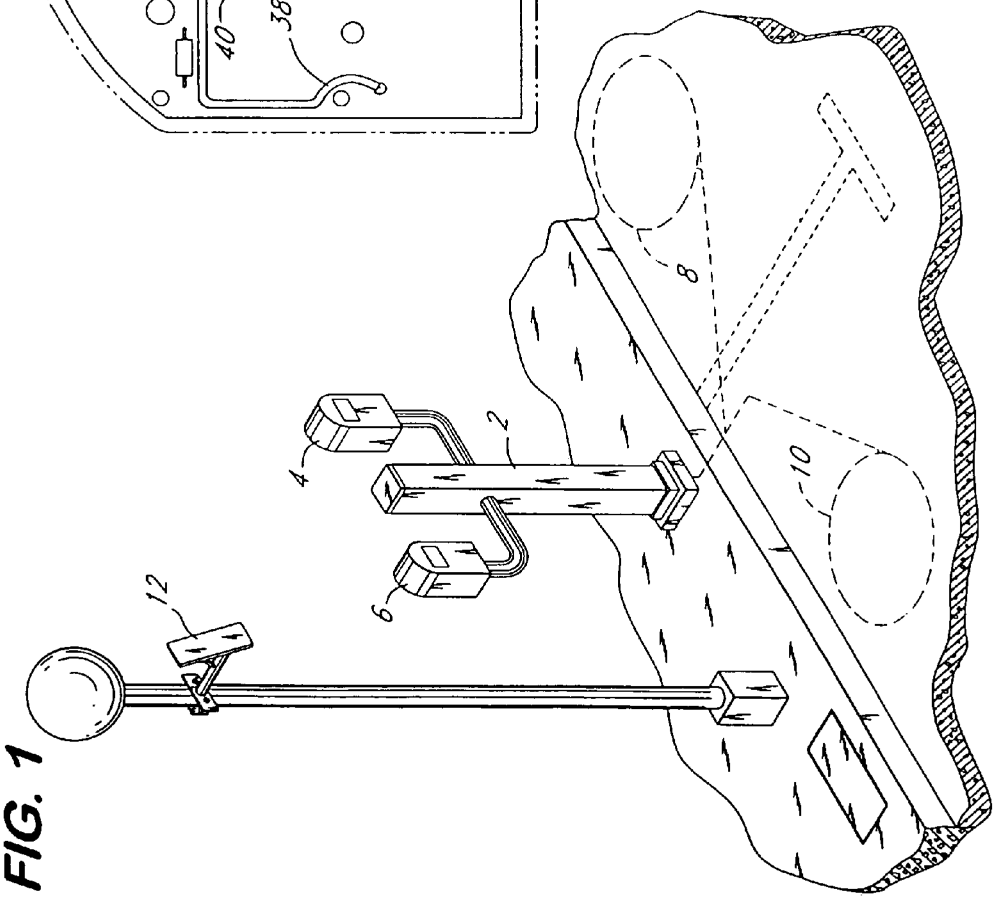
FIG. 1 is a perspective view of an inductive loop-controlled, dual, electronically operable parking meter in accordance with the invention.

DETAILED DESCRIPTION OF THE PREFERRED EMBODIMENT:

Turning in detail to the drawings, FIG. 1 illustrates an inductive loop-controlled, electronically operable parking meter system in accordance with the invention. The curbside parking meter stand 2 supports two electronically operable parking meters 4 and 6. The two inductive loops 8 and 10 are embedded in the pavement in the parking spaces corresponding to the parking meters. The right and left induction loops 8 and 10 are connected to the right and left electronically operable parking meters 4 and 6, respectively.

Inductive coils 8 and 10 each comprise several turns of insulated wire and are each wound to a specific size perimeter. The loops may be shaped as round, square, octagonal, etc. Further the inductive loops may be preformed prior to installation, or they may be wound with a single conductor wire using the saw cut in the pavement as the form. Leads 11 and 12 from the loops 8 and 10 are twisted together to form single pairs of conductors. The twisted pair 11 from loop 8 connects to the electronic circuitry of parking meter 4 and the twisted pair 12 from 10 connects to the parking meter 6. Parking meters 4 and 6 each provide electrical currents to the loops 8 and 10, thus crating independent electrical fields in the proximity of the two inductive loops. Whenever a vehicle enters the electrical field created by loop 8 a disturbance to that field occurs and the electronic circuitry in parking meter 4 establishes the presence of a vehicle in the zone assigned to parking meter 4. Whenever a vehicle enters the electrical field created by loop 10 a disturbance to that field occurs and the electronic circuitry in parking meter 6 establishes the presence of a vehicle in the zone assigned to parking meter 6.

The system may use a solar energy power supply. Systems using a solar power supply may have a solar panel located either at or apart from the electronically operable parking meter stand 2. FIG. 1 illustrates an electronically operable parking meter system using solar power with a solar panel 12 located apart from the parking meter stand 2.

Figure 2:
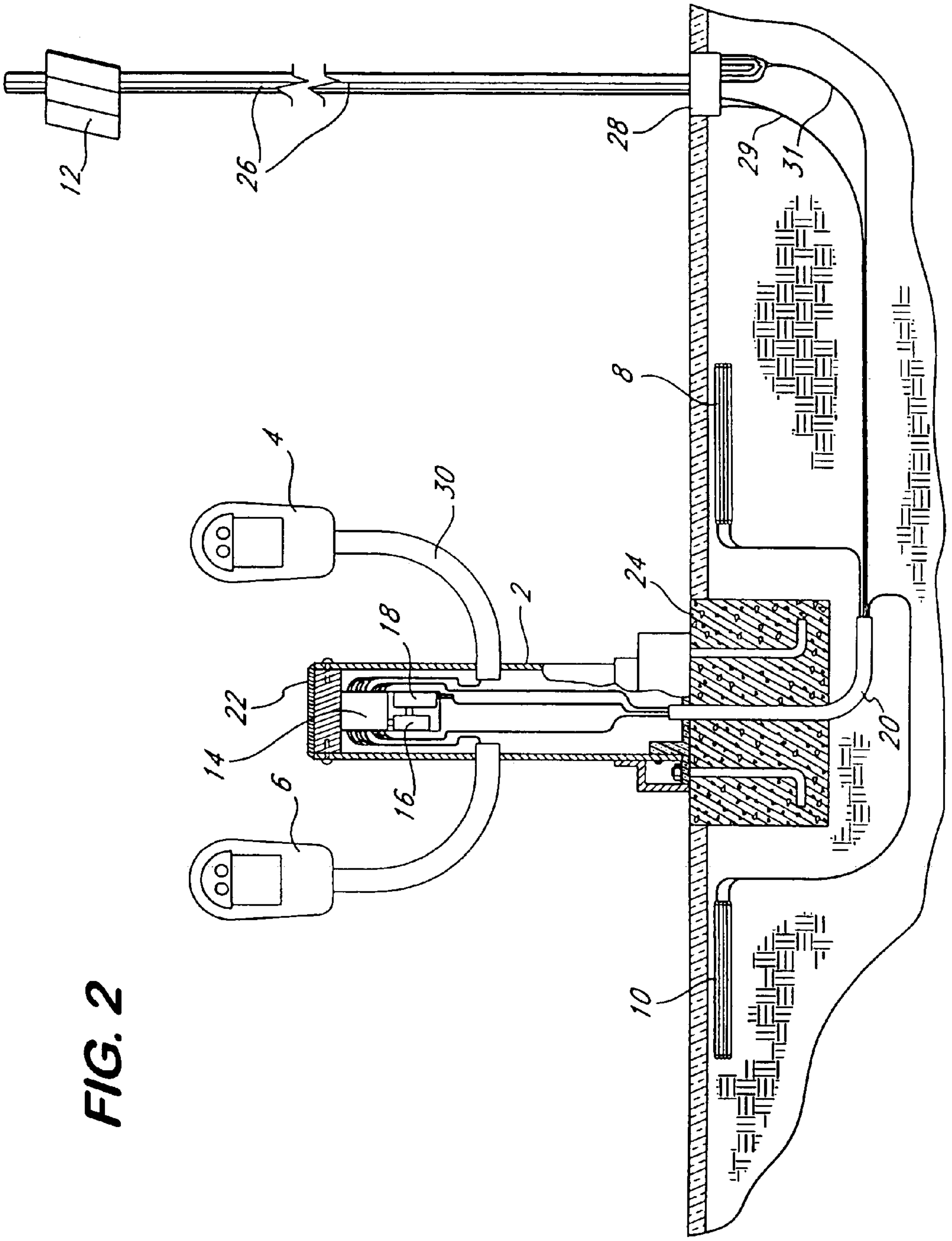
FIG. 2 is a front view of a solar energy powered inductive loop-controlled, dual, electronically operable parking meter in accordance with the invention, wherein the meter stand and the ground are cut-away for clarity.

FIG. 2 illustrates a cut-away view of an inductive loop controlled electronically operable parking meter system. The hollow parking meter stand 2 contains a controller 14, a 12 volt dc battery 16, a solar power regulator 18, a section of conduit 20 and a steel cover 22. Brackets (not shown) support the electronic controller 14, the 12-volt battery 16 and the solar power regulator 18, which are connected to the steel cover. Preferably, the electronic controller 14 comprises a printed circuit board and electronic components.

The solar panel 12 is electronically connected to the solar battery regulator 18. The solar battery regulator 18 is electronically connected to the 12 vdc battery 16. Similarly the 12 vdc battery 16 is electronically connected to the electronic controller 14. The section of conduit 20 extends from the bottom of the parking meter stand 2, through a concrete block footing 24, into the ground near the base of the parking meter stand 2.

A solar panel 12 is located on a support post 26 apart from the parking meter stand 2. The solar panel 12 is electronically connected to a junction box 28 located at the base of the support post 26. The junction box 28 may be located below ground. Insulated electrical wires 29 connect from the junction box, through the section of conduit 20, to the solar power regulator 18 located within the parking meter stand. Communication wires 31 lead from the junction box 28, through the section of conduit 20, to the electronic controller 14 located within the parking meter stand 2.

The wire which forms the coils 8, 10, described above, extend back to the electronic controllers 14 within the parking meters 4 and 6 mounted on stand 2 via the section of conduit 20.

The inductive loops 8 and 10 are composed of, for example, number 16 AWG stranded copper wire covered with insulation suited for direct burial in the pavement. The wire leads feeding to and from the inductive loops 8 and 10 are twisted together in a helical configuration to minimize and control the electrical field emitted from the pair.

There may be one or more parking meters attached to the parking meter stand 2. A metal pipe 30 extends horizontally from a side of the parking meter stand 2 and curves vertically upward. The electronically operable parking meter 4 or 6 may be mounted at the end of the vertical segment of the metal pipe 30. FIG. 2 shows the preferred configuration of two parking meters 4 and 6 attached to the meter stand 2 in the manner described.

It should be evident from the foregoing description that the parking meters used with the present invention are electrically, as opposed to mechanically, activated either by solar energy, battery power or ac power from a mains supply, or a combination of all three types of electrical power. The electrical operation of the parking meters of the present invention represents a significant departure from the prior use of mechanically operated parking meters. The features and advantages of electrically operated parking meters will become more evident from the following description of the electronically operable parking meter system of the invention.

Figure 3A:
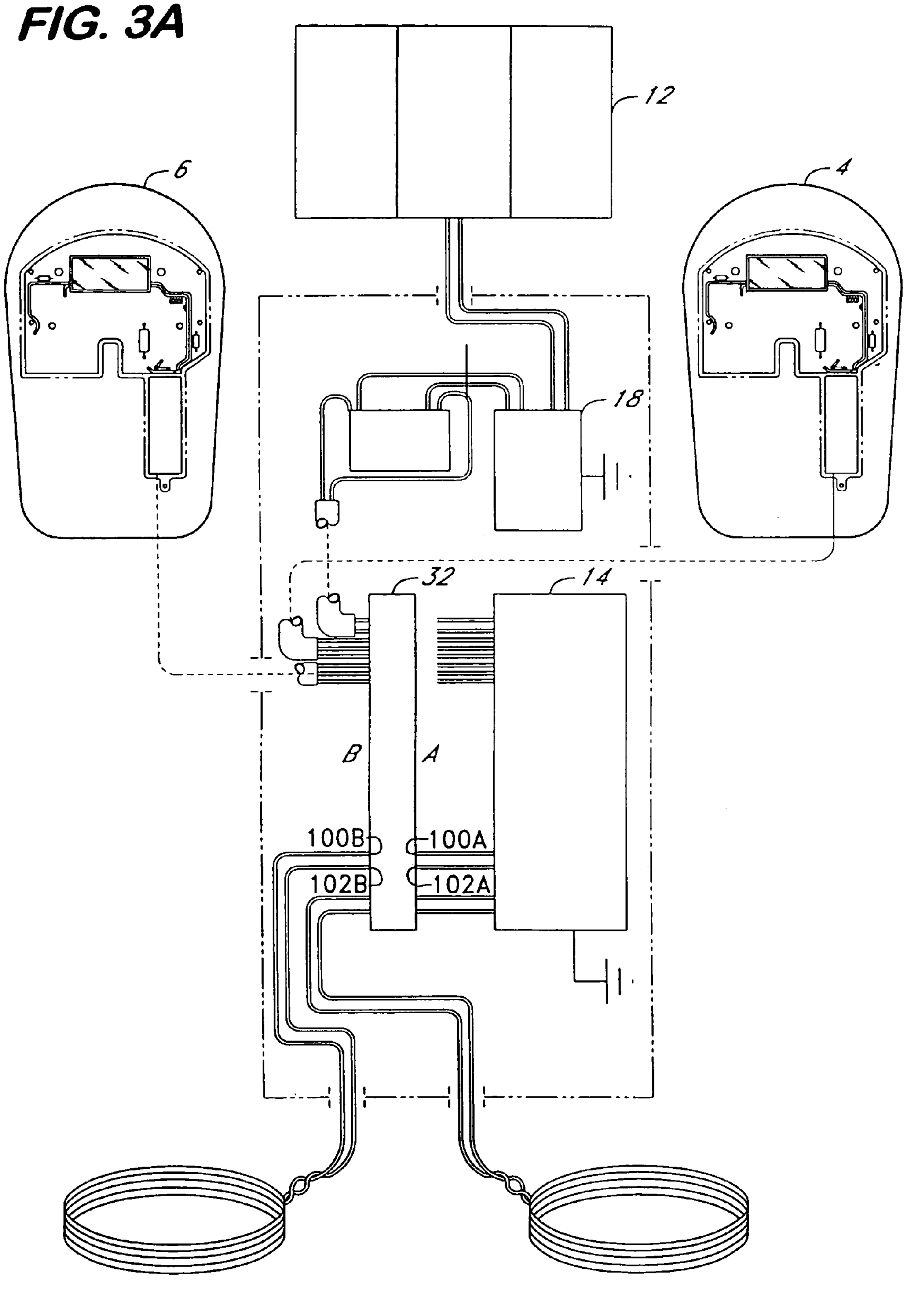
FIG. 3A is a schematic diagram of the wiring system of an inductive loop-controlled, electronically operable parking meter system in accordance with the invention wherein solar power is employed.

FIG. 3A is a schematic diagram of the wiring system of the induction loop controlled electronically operated parking meter system. Inductive loop 8 connects to the electronic controller 14 within the parking meter stand 2 to terminals 100B of a terminal strip 32. A separate inductive loop 10 connects to the electronic controller 14 within the parking meter stand 2 to terminals 102B of the terminal strip 32. Inductive loops 8 and 10 form two separate inductive sensor loops, as described above, for use with two electronically controlled parking meters. This is an example of a dual electronically controlled parking meter system.

Figure 3B:
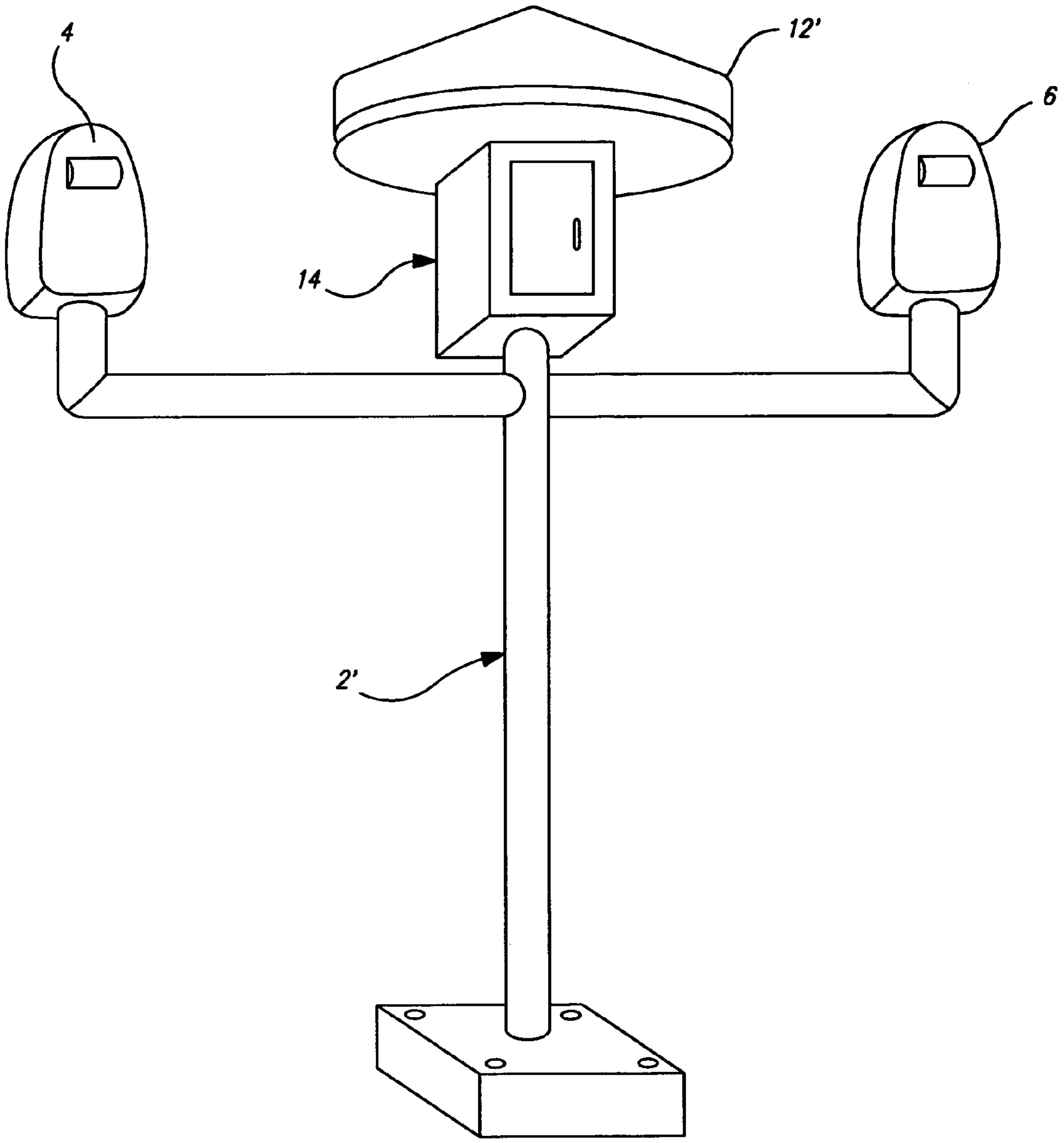
FIG. 3B illustrates an embodiment of the invention wherein the solar panels are mounted on the electronic controller housing, which in turn is mounted on a narrow parking meter stand between dual electronically operable parking meters.

After forming the respective coils, the conductors 8 and 10 travel back to the terminal strip 32, where they are connected through to the electronic controller 14. FIG. 3B shows two such configurations, as would exist in the case of a dual electronically controlled parking meter.

The electronically operable parking meter system may use a solar power energy supply. In the preferred system, the external solar panel 12 is electronically connected to a solar battery regulator 18. Similarly, the battery regulator 18 is electronically connected to the 12 vdc battery 16. The 12 vdc battery 16 is electrically connected to the terminal strip 32, and the terminal strip is electrically connected to the electronic controller 14.

Figure 3C:
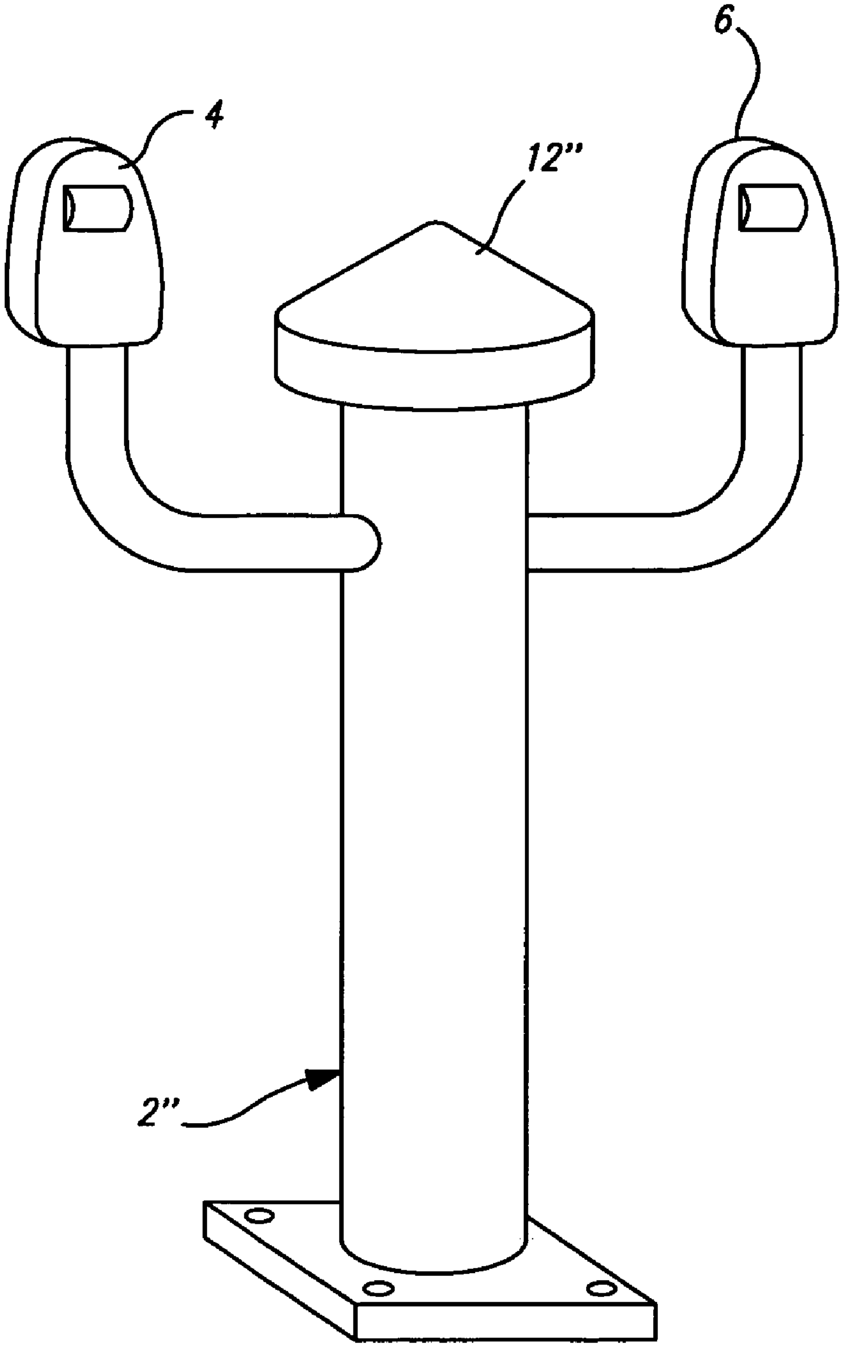
FIG. 3C illustrates the solar panels mounted on top of a large parking meter stand with the electronic controller housed therein.

The solar panel 12 may be mounted a distance from the electronically operable parking meters 4 and 6 as illustrated in FIGS. 1A and 2, or the solar panel 12 may be mounted between electronically operable parking meters 4 and 6 as schematically indicated in FIG. 3A. FIGS. 3B and 3C each show an array of 12 inch solar panels 12' and 12" mounted between the electronically operable parking meters 4 and 6 and wherein the electronic controller 14 is mounted on a 2 foot high parking meter stand 2' and supports the solar panel array 12' as shown in FIG. 3B, or as shown in FIG. 3C, the solar panel array 12" is mounted directly on top of the parking meter stand 2" with the electronic controller 14 mounted within the parking meter stand 2".

The placement of the solar panel array 12 as shown in FIGS. 1A and 2 is best where there may be insufficient direct sunlight to activate the solar array, such as for example where the parking meter system is located on an urban street shielded by tall buildings. However, where the electronically operable parking meters are located where there is sufficient direct sunlight, such as for example in open parking spaces, then the solar panel arrays may preferably be mounted to the parking meter stand as illustrated in FIGS. 3B and 3C.

Figure 4:
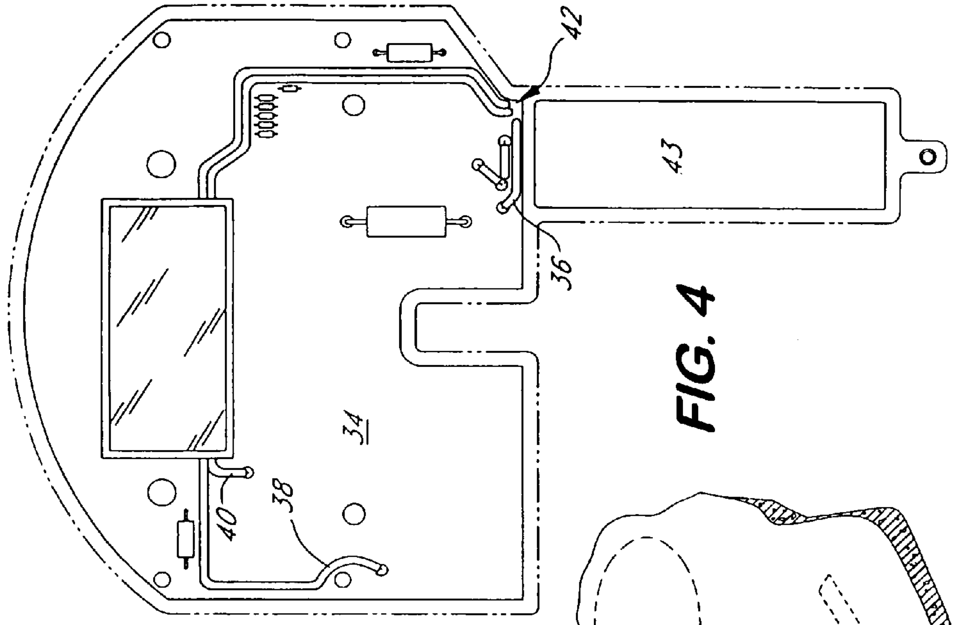
FIG. 4 is a cut-away view of an electronically operable parking meter illustrating the circuitry and wiring modifications necessary to couple the meter to the meter stand.

Each electronically operable parking meter 4 and 6 is electronically connected to the electronic controller 14 that is located within the parking meter stand 2. FIG. 4 illustrates the wiring necessary to connect the printed circuit board 34 in an existing meter to the electronic controller 14. There are three wires which connect the electronic controller 14 to the printed circuit board 34 via the terminal strip 32. One wire 36 serves as ground, another wire 38 controls the reset switch (not shown), and the other wire 40 relates to vehicle detection. All three wires 36, 38 and 40 enter the electronically operable meter 4 or 6 through an opening 42 in the meter battery compartment 43.

Figure 5:
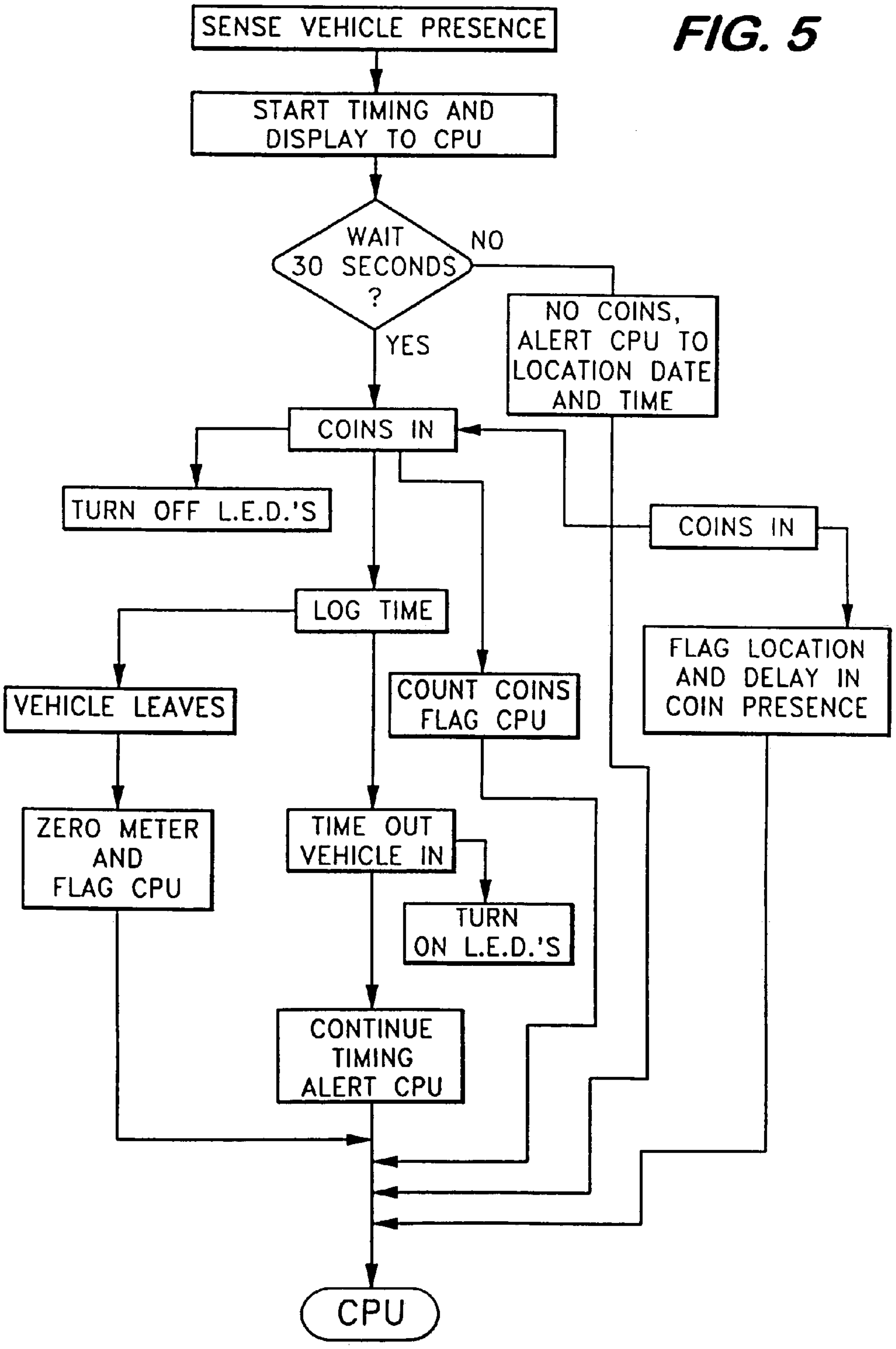
FIG. 5 is a flow diagram showing the communication between an electronically operable parking meter and a DPU in accordance with the invention.

The electronically operable parking meter system may contain a printed circuit board and a cpu within the controller 14 located in the parking meter stand 2. The cpu may be used to monitor and/or control operation of the electronically operable parking meter system of the invention. FIG. 5 is a flow diagram which illustrates communications between an electronically operable parking meter 4 or 6 and its cpu.

When a vehicle enters a parking space the electronically operable parking meter 4 or 6 detects its presence. The electronically operable parking meter then begins timing and notifies the cpu of the vehicle's presence. If coins are not deposited into the meter within a predetermined period of time (perhaps 30–60 seconds), the electronically operable parking meter flashes "zero" on its LCD and alerts the cpu as to the vehicle's presence as well as the time at which the vehicle entered the parking space. When coins are deposited into the electronically operable parking meter, the parking meter performs three functions: (1) it will count the coins, and notify the cpu that coins have been deposited; (2) it will turn off the flashing "zero" on the LCD; and (3) it will continuously measure and display the amount of time remaining on the meter. If there has been delay (more than 30–60 seconds) in depositing coins, the meter will alert the cpu as to the delay.

When a vehicle leaves the parking space while time remains on the meter, the meter may wipe off any remaining time and notify the cpu that the parking space is empty. When a vehicle remains in the parking space after the time has expired, the meter may flash "zero" in its LCD and alert the cpu that a vehicle has remained in the parking space after time has expired.

Multiple induction loop-controlled electronically operable parking meters may have a single power supply. As stated previously, the power supply may be solar energy, where a single solar panel is used to supply energy to multiple meters. Preferably, the solar panel may be attached to an existing structure, such as a street lamp, pole or a traffic signal support post. Alternatively, multiple parking meters could receive their power from a nearby traffic signal power supply.

Figure 6:
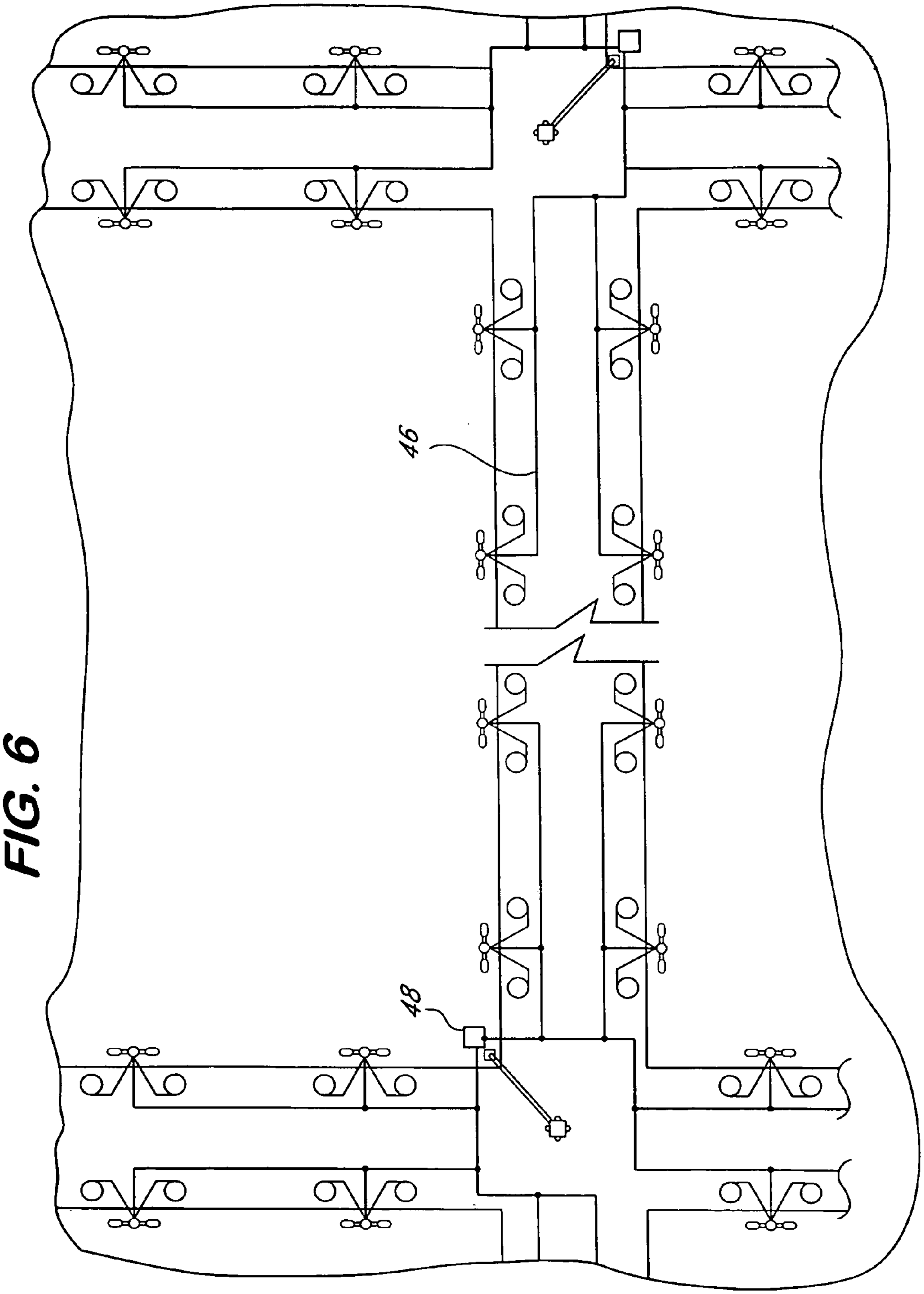
FIG. 6 is an overview of multiple dual electronically operable parking meters connected to an existing traffic signal power supply via power lines in accordance with the invention.

FIG. 6 illustrates power lines 46 running from an existing traffic signal power supply 48 to multiple dual electronic operable parking meter systems.

Multiple electronically operable parking meters may be connected to a single cpu which receives information regarding revenue collection at each meter and vehicle traffic at each parking space. The cpu may relay information relating to vehicle traffic and revenue collection to an information gathering and/or processing center. Communications between the cpu and the information processing center may be by a number of means, including wire, fiber optics and radio waves.

Figure 7:
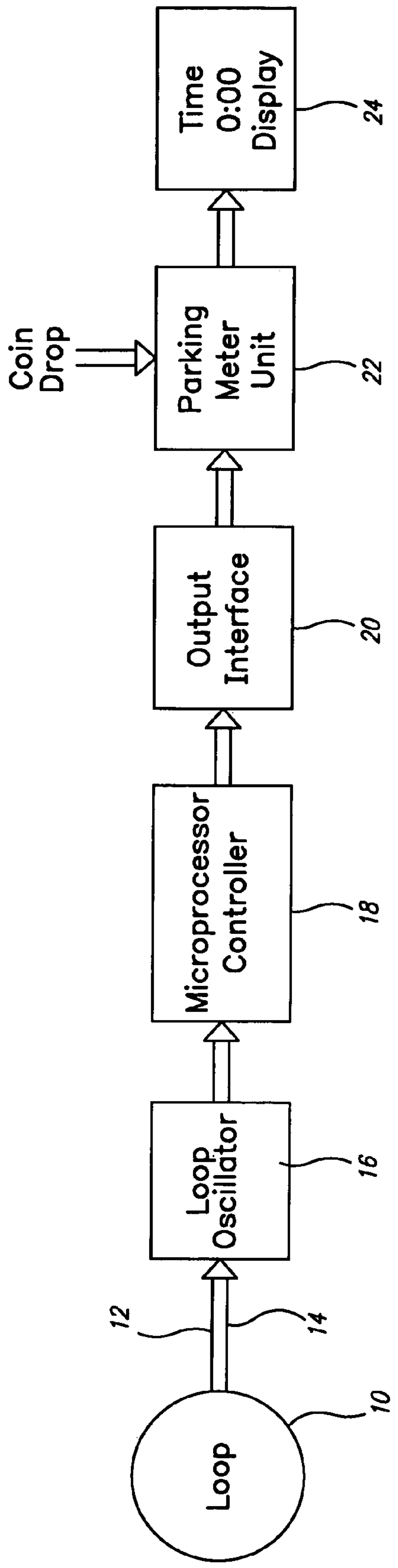
FIG. 7 is a block diagram representation of the vehicle detector system and the electronic parking meter of the invention.

In FIG. 7 inductance loop 10, comprising 4 to 5 loops of conductor, is connected by a twisted conductor pair 12, 14 to a loop oscillator 16, which in the preferred embodiment of the invention oscillates at 80 KHz. The function of the loop oscillator 16 is to detect the presence or absence of a vehicle in the associated parking space (not shown), in which the inductance loop 10 is buried below the surface, by detecting a change in he inductance of the inductance loop. The presence of a vehicle causes an effective decrease in the inductance and the absence of a vehicle results in an effective increase in the inductance of the inductance loop 10. The effective change in the inductance of the inductance loop 10 causes a commensurate change in the oscillating frequency of the loop oscillator 16, with decreasing inductance causing an increase in the frequency and an increasing inductance causing a decrease in the oscillating frequency of the loop oscillator.

By effectively sensing the change in frequency caused by the aforementioned change in inductance, which in turn represents the presence or absence of a vehicle in the associated parking place, the loop oscillator 16 positively identifies the presence or absence of a vehicle in the parking space. The loop oscillator 16 provides signals to the microprocessor controller 18 that enables it to positively determine the presence or absence of a vehicle in the associated parking space. The microprocessor controller 18 generates serial data which is input to the electronic parking meter 22 through output interface 20 to enable the electronic parking meter to operate in a desired manner (to be more fully described hereinafter). The electronic parking meter 22 is capable of accepting coins enabling time to be purchased in accordance with the amount of money deposited in the parking meter (as symbolically illustrated in FIG. 6 by the "coin drop") in accordance with accepted procedures for the same. Finally, the time purchased by the coin drop in electronic parking meter 22 is displayed by time display 24.

Figure 8:
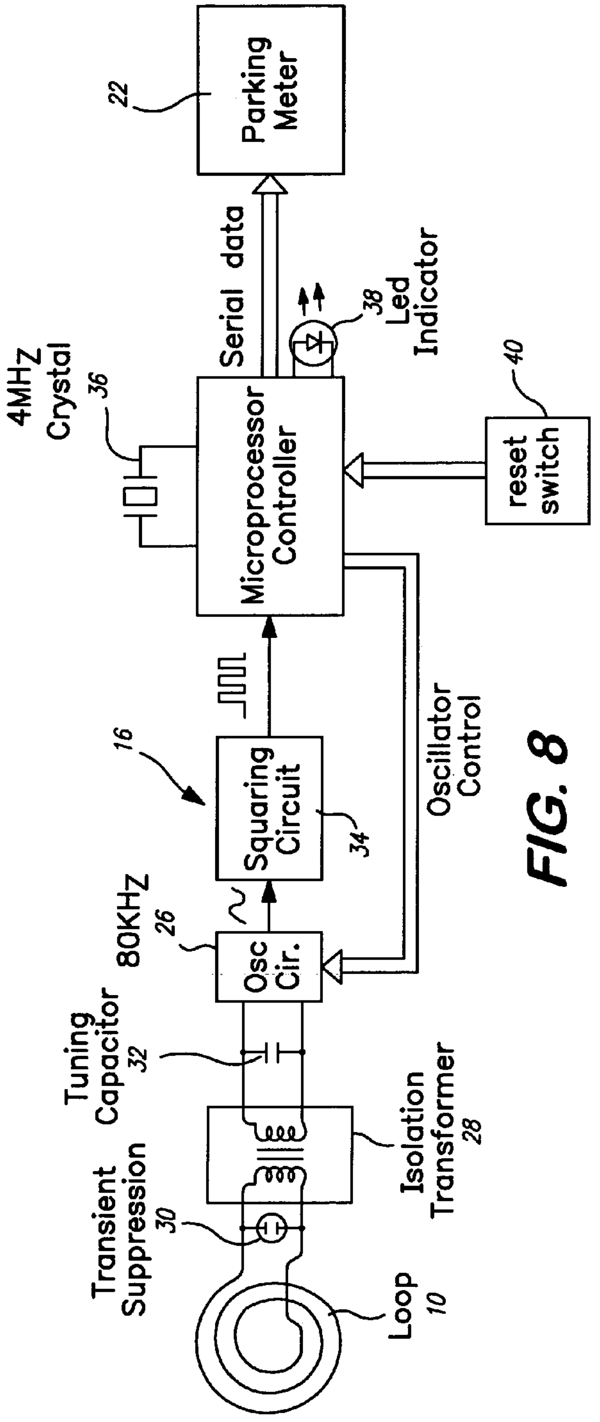
FIG. 8 is a circuit schematic of the detector system of the present invention.

As illustrated in FIG. 8, inductance loop 10 is connected to oscillator circuit 26 through an isolation transformer 28, which includes a capacitor 30 for suppression of transients, and a tuning capacitor 32 connected in parallel with the secondary of isolation transformer 28 and oscillator circuit 26.

Figure 10:
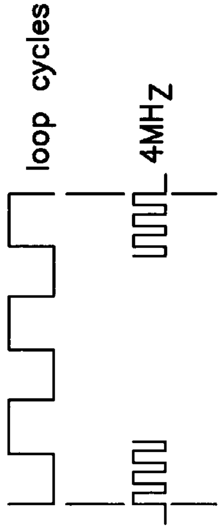
FIG. 10 shows the relationship of the detector loop oscillation cycles to the crystal oscillation cycles of the microprocessor controller in the loop detector circuit.

Oscillator circuit 26 is designed to oscillate at a base frequency of 80 KHz, but has a variable rate of oscillation about the base frequency in accordance with the presence or absence of a vehicle in the associated parking space. The oscillatory output of oscillator circuit 26 is squared by squaring circuit 34 to enable the oscillating signal to be accepted by microprocessor controller 18. Microprocessor controller 18 includes a 4 MHz crystal oscillator 36 which provides the base operating frequency of the microprocessor controller as shown in FIG. 10.

It is a significant feature of the invention that the electronically operated parking meter 22 and the oscillator circuit 26 are operated by independent dry cell batteries.

Figure 9:
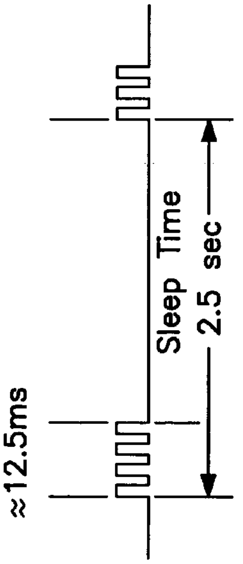
FIG. 9 illustrates the ON/OFF cycle of operation of the detector circuit of FIG. 7.

Microprocessor controller 18 provides an ON/OFF duty cycle of operation of the detector system 16 as illustrated in FIG. 9 in which the detector system 16 is activated for approximately 12.5 ms and inactive ("sleep time") for 2.5 seconds minus the 12.5 ms operating time of the detector system. This is an important feature of the invention, as it significantly reduces the battery power required for operating the detector system of the invention. This enables the battery operable up to nine to twelve months, which considerably reduces the maintenance required of the detector system.

LED indicator 38 provides an indication of the operation of the microprocessor controller 18 and reset switch 40 enables the controller to be reset as desired.

The detection of the presence or absence of a vehicle in the associated parking space is as follows. The presence or absence of a vehicle in the associated parking space respectively decreases or increases the inductance of the associated loop 10 , which in turn causes a respective increase or decrease in the frequency of operation of the oscillator circuit 26. The 4 MHz frequency signals from the microprocessor controller 18 are superimposed with the frequency of the oscillator circuit 26 as illustrated in FIG. 9. Thus a decreasing frequency of the oscillator circuit 26, resulting in a longer period of oscillation, will produce more 4 MHz signals in a given period of oscillation of the oscillator circuit 26 than in the normal 80 KHz operation of the oscillator circuit, thereby enabling the microprocessor controller to determine the absence of a vehicle in the associated parking space.

Similarly for an increase in the frequency of the oscillator circuit 26, associated with the presence of a vehicle in the associated parking space, there is less of a period of oscillation of the oscillator circuit 26 and a commensurate decrease in the number of 4 MHz signals to be counted by the microprocessor circuit 18.

The microprocessor circuit 18 also provides serial data output to the electronic parking meter 22 to enable it to function in a desired manner (to be described more fully hereinafter).

Therefore, it is desired that the present invention not be limited to the embodiments specifically described, but that it include any and all such modifications and variations that would be obvious to those skilled in this art. It is my intention that the scope of the present invention should be determined by any and all such equivalents of the various terms and structure as recited in the following annexed claims.

What is claimed is:

1. An electronic parking meter system comprising:

an electronic parking meter for determining the time a parking space associated with the parking meter is occupied by a vehicle and receiving coins denoting desired parking time and indicating said time;

an inductive loop vehicle detection sensor located to detect both the physical presence or absence of a vehicle in said parking space and emitting a respective signal indicative thereof;

a microprocessor controller coupled to the sensor and the electronic parking meter for selectively controlling the electronic parking meter and the controller responsive to the sensor signal;

the electronic parking meter indicating time provided upon payment with a vehicle occupying said space to obtain a fixed amount of time in accordance with the amount of payment, said electronic parking meter decrementing the indicated time;

said controller initializing said electronic parking meter to zero when the sensor signals the controller that a vehicle no longer occupies the parking space;

said detection sensor includes a variable oscillator circuit oscillating at a base frequency and responsive to the inductance of the inductive loop for providing said signals to the microprocessor indicating the presence or absence of a vehicle in the parking space;

said microprocessor controller including a crystal oscillator producing pulses and operating at approximately 50 times the base frequency of the variable oscillator circuit and initiating a 12.5 ms long charge to said variable oscillator circuit every 2.5 seconds for the purpose of measuring the operating frequency of said circuit while conserving power as needed for the practical application of the technology in parking control;

the presence or absence of a vehicle in the parking space causing a respective decrease or increase in the inductance of the inductive loop and a respective commensurate increase or decrease in the operating frequency and a respective decrease or increase in the period of the variable oscillator circuit, thereby decreasing or increasing the number of crystal oscillator pulses in each period of the variable oscillator circuit;

said oscillator providing an output signal including said crystal oscillator pulses to said microprocessor controller; and said microprocessor controller superimposes the signals received from the variable oscillator circuit during each 12.5 ms time frame in which the variable oscillator circuit is charged with the crystal oscillator pulses clock to determine the presence or absence of a vehicle in the parking space.

2. An electronic parking meter system according to claim 1, wherein said electronic parking meter further including means for counting coins deposited therein and setting a time interval for notifying the controller of the amount of coins deposited; means for continuously measuring the amount of time remaining in said time interval; and means for displaying the amount of time remaining on the meter and flashing "zero" to indicate "zero" time.

3. An electronic parking meter system according to claim 1, wherein said electronic parking meter further including means for signaling the controller that a vehicle is in the parking space and that no coins have been deposited in the electronic parking meter.

4. An electronic parking meter system according to claim 3, wherein said electronic parking meter further including means for delaying the notification of the controller of the depositing of coins in the electronic parking meter from the time that the detection sensor detects the presence of a vehicle in said parking space.

5. An electronic parking meter system comprising:

multiple electronic parking meters, each electronic parking meter respectively determining the time a parking space associated with the respective electronic parking meter is occupied by a vehicle and receiving coins denoting desired parking time and indicating that time;

multiple inductive loop vehicle detection sensors and each respective inductive loop vehicle detection sensor being located to detect both the physical presence or absence of a vehicle in said respective parking space and emitting a respective signal indicative thereof;

multiple microprocessor controllers, each controller being coupled to a corresponding sensor and a corresponding electronic parking meter for selectively controlling each electronic parking meter and each controller responsive to a respective sensor signal;

each electronic parking meter indicating time provided upon payment with a vehicle occupying said space to obtain a fixed amount of time in accordance with the amount of payment, each said electronic parking meter decrementing the indicated time;

said controller initializing said electronic parking meter to zero when the corresponding sensor signals the corresponding controller that a vehicle no longer occupies the corresponding parking space of the associated meter;

said detection sensor includes a variable oscillator circuit oscillating at a base frequency and responsive to the inductance of the inductive loop for providing said signals to the microprocessor indicating the presence or absence of a vehicle in the parking space;

said microprocessor controller including a crystal oscillator producing pulses and operating at approximately 50 times the base frequency of the variable oscillator circuit and initiating a 12.5 ms long charge to said variable oscillator circuit every 2.5 seconds for the purpose of measuring the operating frequency of said circuit while conserving power as needed for the practical application of the technology in parking control;

the presence or absence of a vehicle in the parking space causing a respective decrease or increase in the inductance of the inductive loop and a respective commensurate increase or decrease in the operating frequency and a respective decrease or increase in the period of the variable oscillator circuit, thereby decreasing or increasing the number of crystal oscillator pulses in each period of the variable oscillator circuit;

said oscillator providing an output signal including said crystal oscillator pulses to said microprocessor controller; and said microprocessor controller superimposes the signals received from the variable oscillator circuit during each 12.5 ms time frame in which the variable oscillator circuit is charged with the crystal oscillator pulses to determine the presence or absence of a vehicle in the parking space.

6. An electronic parking meter system according to claim 5, wherein said electronic parking meter further including means for counting coins deposited therein and setting a time interval in accordance with the amount of coins deposited; means for notifying the corresponding microprocessor controller of the amount of coins deposited; means for continuously measuring the amount of time remaining in said time interval; and means for displaying the amount of time remaining on the meter and flashing "zero" to indicate "zero" time.

7. An electronic parking meter system according to claim 5, wherein said electronic parking meter further including means for signaling the controller that a vehicle is in the parking space and that no coins have been deposited in the electronic parking meter.

8. An electronic parking meter system according to claim 7, wherein said electronic parking meter further including means for delaying the notification of the controller of the depositing of coins in the electronic parking meter from the time that the detection sensor detects the presence of a vehicle in said parking space.

9. An electronic parking meter comprising:

multiple electronic parking meters, each electronic parking meter respectively determining the time a parking space associated with the respective electronic parking meter is occupied by a vehicle and receiving coins denoting desired parking time and indicating said time;

multiple inductive loop vehicle detection sensors and each respective inductive loop vehicle detection sensor located to detect both the physical presence or absence of a vehicle in a respective parking space and emitting a signal indicative thereof;

multiple microprocessor controllers, each controller being coupled to a corresponding sensor and a corresponding electronic parking meter for selectively controlling each electronic parking meter for selectively controlling each electronic parking meter and each controller responsive to a respective sensor signal;

a CPU coupled to each electronic parking meter for data transmission;

each electronic parking indicating time provided upon payment with a vehicle occupying said space to obtain a fixed amount of time in accordance with the amount of payment, each said electronic parking meter decrementing the indicating time;

each said controller initializing said electronic parking meter to zero when the corresponding sensor signals the corresponding controller that a vehicle no longer occupies the corresponding parking space of the associated electronic parking meter;

said detection sensor includes a variable oscillator circuit oscillating at a base frequency and responsive to the inductance of the inductive loop for providing signals to the microprocessor indicating the presence or absence of a vehicle in the parking space;

said microprocessor controller including a crystal oscillator producing pulses and operating at approximately 50 times the base frequency of the variable oscillator circuit and initiating a 12.5 ms long charge to said variable oscillator circuit every 2.5 seconds for the purpose of measuring the operating frequency of said circuit while conserving power as needed for the practical application of the technology in parking control;

the presence or absence of a vehicle in the parking space causing a respective decrease or increase in the inductance of the inductive loop and a respective commensurate increase or decrease in the operating frequency and a respective decrease or increase in the period of the variable oscillator circuit, thereby decreasing or increasing the number of crystal oscillator pulses in each period of the variable oscillator circuit;

said oscillator providing an output signal including said crystal oscillator pulses to said microprocessor controller; and said microprocessor controller superimposes the signals received from the variable oscillator circuit during each 12.5 ms time frame in which the variable oscillator circuit is charged with the crystal oscillator pulses to determine the presence or absence of a vehicle in the parking space.

10. An electronic parking meter system according to claim 9, wherein said electronic parking meter further including means for counting coins deposited therein and setting a time interval in accordance with the amount of coins deposited; means for notifying the corresponding microprocessor controller of the amount of coins deposited; means for continuously measuring the amount of time remaining in said time interval; and means for displaying the amount of time remaining on the meter and flashing “zero” to indicate “zero” time.

11. An electronic parking meter system according to claim 9, wherein said electronic parking meter further including means for signaling the controller that a vehicle is in the parking space and that no coins have been deposited in the electronic parking meter.

12. An electronic parking meter system according to claim 11, wherein said electronic parking meter further including means for delaying the notification of the controller of the depositing of coins in the electronic parking meter from the time that the detection sensor detects the presence of a vehicle in said parking space.

13. A component of an electronic parking meter system, comprising:

an inductive loop vehicle detection sensor located to detect both the physical presence or absence of a vehicle in said parking space and emitting a respective signal indicative thereof; the inductive loop comprising a winding of several loops wound one on top of the other; means for securing the several loops to preserve the axial orientation of the winding and maintain the signal output from the winding; the winding being embedded in the parking space; and the respective ends of the winding being twisted with respect to one another to reduce the electric field effects of the winding;

an electric parking meter for determining the time a parking space associated with the electronic parking meter is occupied by a vehicle and receiving coins denoting desired parking time and indicating said time;

a microprocessor controller coupled to the sensor and the electronic parking meter and receiving the respective signal from said inductive loop and indicative of the presence or absence of a vehicle for selectively controlling the electronic parking meter; and said detection sensor includes a variable oscillator circuit oscillating at a base frequency and responsive to the inductance of the inductive loop for providing said signals to the microprocessor indicating the presence or absence of a vehicle in the parking space;

said microprocessor controller including a crystal oscillator producing pulses and operating at approximately 50 times the base frequency of the variable oscillator circuit and initiating a 12.5 ms long charge to said variable oscillator circuit every 2.5 seconds for the purpose of measuring the operating frequency of said circuit while conserving power as needed for the practical application of the technology in parking control;

the presence or absence of a vehicle in the parking space causing a respective decrease or increase in the inductance of the inductive loop and a respective commensurate increase or decrease in the operating frequency and a respective decrease or increase in the period of the variable oscillator circuit, thereby decreasing or increasing the number of crystal oscillator pulses in each period of the variable oscillator circuit;

said oscillator providing an output signal including said crystal oscillator pulses to said microprocessor controller; and said microprocessor controller superimposes the signals received from the variable oscillator circuit during each 12.5 ms time frame in which the variable oscillator circuit is charged with the crystal oscillator pulses to determine the presence or absence of a vehicle in the parking space.

14. The component of an electronic parking meter system of claim 13, wherein said controller de-energizes the sensor with no time displayed on the electronic parking meter to prevent the sensor from generating a false output with the entry or departure of a vehicle from the parking space.

15. The component of an electronic parking meter system of claim 13, wherein said controller causes the electronic parking meter to emit a flashing signal regardless of the presence or absence of a vehicle in the parking space.

16. A component of an electronic parking meter system, comprising:

an inductive vehicle detection sensor located to detect both the physical presence or absence of a vehicle in said parking space and emitting a respective signal indicative thereof;

an electronic parking meter for determining the time a parking space associated with the electronic parking meter is occupied by a vehicle and receiving coins denoting desired parking time and indicating said time;

a microprocessor controller coupled to the sensor and the electronic parking meter and receiving the respective signal indicative of the presence or absence of a vehicle for selectively controlling the electronic parking meter;

said controller initializing said electronic parking meter to zero when the sensor signals the controller that a vehicle no longer occupies the parking space;

said detection sensor includes a variable oscillator circuit oscillating at a base frequency and responsive to the inductance of the inductive loop for providing sai dsignals to the microprocessor indicating the presence or absence of a vehicle in the parking space;

said microprocessor controller including a crystal producing pulses and oscillator operating at approximately 50 times the base frequency of the variable oscillator circuit and initiating a 12.5 ms long charge to said variable oscillator circuit every 2.5 seconds for the purpose of measuring the operating frequency of said circuit while conserving power as needed for the practical application of the technology in parking control;

the presence or absence of a vehicle in the parking space causing a respective decrease or increase in the inductance of the inductive loop and a respective commensurate increase or decrease in the operating frequency and a respective decrease or increase in the period of the variable oscillator circuit, thereby decreasing or increasing the number of crystal oscillator pulses in each period of the variable oscillator circuit;

said oscillator providing an output signal including said crystal oscillator pulses to said microprocessor controller; and said microprocessor controller superimposes the signals received from the variable oscillator circuit during each 12.5 ms time frame in which the variable oscillator circuit is charged with the crystal oscillator pulses to determine the presence or absence of a vehicle in the parking space.

17. The component of an electronic parking meter of claim 16, wherein said controller minimizes power consumption by de-energizing the sensor in response to no time displayed on the electronic parking meter.

18. The component of an electronic parking meter system of claim 16, wherein said controller de-energizes the sensor with no time displayed on the electronic parking meter to prevent the sensor from generating a false output with the entry or departure of a vehicle from the parking space.

19. The component of an electronic parking meter system of claim 16, wherein said controller causes the electronic parking meter to emit a flashing signal regardless of the presence or absence of a vehicle in the parking space.

20. The component of an electronic parking meter system of claim 16, wherein said controller in response to a signal from said sensor indicating the presence of a vehicle and a signal from said electronic parking meter that time is displayed generates a vehicle present signal.

21. The component of an electronic parking meter system of claim 17, wherein said controller de-energizes the sensor with no time displayed on the electronic parking meter to prevent the sensor from generating a false output with the entry or departure of a vehicle from the parking space.

22. The component of an electronic parking meter system of claim 21, wherein said microprocessor controller causes the electronic parking meter to emit a flashing signal regardless of the presence or absence of a vehicle in the parking space.

23. The component of an electronic parking meter system of claim 22, wherein said controller in response to a signal from said sensor indicating the presence of a vehicle and a signal from said electronic parking meter that time is displayed generates a vehicle present signal.

24. The component of an electronic parking meter system of claim 17, wherein said controller initializes said electronic parking meter to zero when the sensor signals the controller that a vehicle no loner occupies the parking space.

25. The component of an electronic parking meter of claim 22, wherein said controller minimizes power consumption by de-energizing the sensor in response to no time displayed on the electronic parking meter.

26. The component of an electronic parking meter system of claim 17, wherein said controller in response to a signal from said sensor indicating the presence of a vehicle and a signal from said electronic parking meter that time is displayed generates a vehicle present signal.

27. The component of an electronic parking meter of claim 24, wherein said controller minimizes power consumption by de-energizing the sensor in response to no time displayed on the electronic parking meter.

28. The component of an electronic parking meter system of claim 25, wherein said controller de-energizes the sensor with no time displayed on the electronic parking meter to prevent the sensor from generating a false output with the entry or departure of a vehicle from the parking space.

29. The component of an electronic parking meter system of claim 14, wherein said controller causes the electronic parking meter to emit a flashing signal regardless of the presence or absence of a vehicle in the parking space.

30. The component of an electronic parking meter system of claim 25, wherein said controller in response to a signal from said sensor indicating the presence of a vehicle and a signal from said electronic parking meter that time is displayed generates a vehicle present signal.

* * * * *